US012371943B2

(12) United States Patent
Rebarchak et al.

(10) Patent No.: US 12,371,943 B2
(45) Date of Patent: Jul. 29, 2025

(54) UNIVERSAL ENDLOCK-WINDLOCK

(71) Applicant: CORNELLCOOKSON, LLC, Mountain Top, PA (US)

(72) Inventors: Christopher J. Rebarchak, White Haven, PA (US); Joseph L. Balay, Sugarloaf, PA (US)

(73) Assignee: CornellCookson, Mountain Top, PA (US)

( * ) Notice: Subject to any disclaimer, the term of this patent is extended or adjusted under 35 U.S.C. 154(b) by 698 days.

(21) Appl. No.: 16/839,585

(22) Filed: Apr. 3, 2020

(65) Prior Publication Data

US 2021/0310303 A1 Oct. 7, 2021

(51) Int. Cl.
*E06B 9/58* (2006.01)
*E06B 9/15* (2006.01)

(52) U.S. Cl.
CPC ................ *E06B 9/581* (2013.01); *E06B 9/15* (2013.01); *E06B 2009/1505* (2013.01); *E06B 2009/1583* (2013.01)

(58) Field of Classification Search
CPC ..... E06B 2009/1577; E06B 2009/1583; E06B 2009/1594; E06B 9/581; E06B 2009/1588; E06B 2009/1544; E06B 2009/1533; E06B 9/15; E06B 2009/1505
See application file for complete search history.

(56) References Cited

U.S. PATENT DOCUMENTS 830,456 A * 9/1906 Schultes ............... E05D 15/165 160/229.1
1,398,241 A * 11/1921 Osterberg .............. B61D 17/06 105/410
1,579,915 A * 4/1926 Cornell ..................... E06B 9/15 160/133
1,918,415 A * 7/1933 Miller ....................... E06B 9/58 160/133
2,301,845 A * 11/1942 Anderson ................. E06B 9/15 160/235
2,954,081 A * 9/1960 Recchione ................ E06B 9/17 160/219
3,076,499 A * 2/1963 Zoll .......................... E06B 9/15 160/133
3,489,200 A * 1/1970 Recchione ................ E06B 9/15 160/133
4,630,664 A 12/1986 Magro
4,756,128 A * 7/1988 Danieli ..................... E02D 5/80 52/156
4,986,331 A 1/1991 Denkenjohann
(Continued)

OTHER PUBLICATIONS

International search report and the written opinion, mailed in corresponding application No. PCT/US 2021/025226 on Jun. 23, 2021, 11 pages.
(Continued)

*Primary Examiner* — Daniel P Cahn
*Assistant Examiner* — John W Hanes, Jr.

(57) ABSTRACT

In example implementations, a windlock is provided. The windlock includes a body, a windlock lip, and a gusset. The body includes holes to receive a fastener to be coupled to a slat of a roll-up door. The windlock lip is formed from a portion of the body that is bent from the body. The gusset is coupled to the body and the windlock to provide mechanical strength to the windlock lip.

17 Claims, 6 Drawing Sheets

DETAIL B

(56) References Cited

U.S. PATENT DOCUMENTS

| | | | | | |
|---|---|---|---|---|---|
| 5,253,694 | A * | 10/1993 | Bernardo | E06B 9/581 160/133 |
| 5,377,738 | A * | 1/1995 | Cooper | E06B 9/15 160/264 |
| 5,542,460 | A | 8/1996 | Mckeon | |
| 5,657,805 | A * | 8/1997 | Magro | E06B 9/581 160/133 |
| 5,673,740 | A * | 10/1997 | Park | E06B 9/15 160/180 |
| 5,819,470 | A * | 10/1998 | Kionecka | E06B 11/08 49/46 |
| 6,068,040 | A * | 5/2000 | Magro | E06B 9/581 160/133 |
| 6,161,606 | A | 12/2000 | Wegner et al. | |
| 6,457,291 | B2 * | 10/2002 | Wick | B62D 21/03 280/789 |
| 6,685,592 | B2 * | 2/2004 | Fraczek | E06B 9/44 475/14 |
| 7,111,660 | B2 | 9/2006 | Hartmann | |
| 7,464,743 | B1 * | 12/2008 | Berger, Jr. | E06B 9/581 160/133 |
| 8,789,722 | B2 * | 7/2014 | Reuthe | B65D 88/128 220/628 |
| 9,187,953 | B2 * | 11/2015 | Drifka | E06B 9/58 |
| 9,790,738 | B2 * | 10/2017 | Jung | E06B 9/90 |
| 10,590,647 | B2 * | 3/2020 | Haba | E04B 2/58 |
| 10,794,112 | B2 * | 10/2020 | Lambridis | E06B 9/70 |
| 10,844,656 | B2 * | 11/2020 | Motosko | E04H 9/14 |
| 11,131,090 | B2 * | 9/2021 | Klein | E06B 9/174 |
| 11,203,900 | B2 * | 12/2021 | Miller | E06B 9/581 |
| 11,230,880 | B2 * | 1/2022 | Magro | E06B 9/165 |
| 2005/0155315 | A1 * | 7/2005 | Davis | E04B 7/045 52/712 |
| 2008/0121353 | A1 * | 5/2008 | Detmer | E06B 9/90 160/311 |
| 2010/0219306 | A1 * | 9/2010 | Detmer | E06B 9/78 29/401.1 |
| 2015/0368962 | A1 * | 12/2015 | Motosko | E04H 9/14 160/107 |
| 2016/0258177 | A1 * | 9/2016 | Faries | F16M 13/02 |
| 2017/0067285 | A1 * | 3/2017 | Lambridis | E06B 9/17046 |
| 2019/0323282 | A1 * | 10/2019 | Sowinski | E06B 3/486 |
| 2019/0390511 | A1 | 12/2019 | Lambridis et al. | |

OTHER PUBLICATIONS

1st Examination Report mailed in corresponding SA Application No. 52440788 on Dec. 28, 2022, 10 pages.

* cited by examiner

DETAIL B

UNIVERSAL ENDLOCK-WINDLOCK

BACKGROUND

Roll-up doors are often used to form closures over openings in buildings, such as garages, warehouses, stores, etc. Such a roll-up door may be opened and closed by coiling or uncoiling the roll-up door around a shaft. The shaft may be controlled by a motor to open and close the roll-up door.

The roll-up door may be formed by slats that are coupled together and placed in a guide. The guide may help the slats to maintain alignment during movement as the roll-up door is opened and closed.

DETAILED DESCRIPTION

Examples described herein provide examples of a windlock and an endlock windlock. As discussed above, a roll-up door may include connected slats that are coiled around a shaft to open and uncoiled to close. The slats may be fabricated from metal and secured together within guides along the side of the opening or door.

The slats may be connected at the ends with an endlock. In some instances, windlocks may be used to secure the slats of the roll-up door to a guide to ensure that the slats are not blown out of the guides when exposed to a wind load.

Previous endlocks and/or windlocks were designed for either being used on the left side or being used on the right side of the slats-creating two different endlock and/or windlock designs that are mirror images. In addition, different endlocks and/or windlocks may be used for different slats depending on a spacing of openings on the slats. Thus, different types of endlocks and/or windlocks were used to connect the slats. This may lead to additional overhead, inventory, and costs associated with installing, maintaining, and/or building the different types of endlocks and/or windlocks.

In addition, the previous endlock and/or windlock designs were made to have a profile that extends beyond the profile of the slats. Thus, portions of the endlocks and/or windlocks may protrude above the individual slat external surface. As the roll-up door was coiled around the shaft to open the door, the weight of each coil of slats would press down on the endlocks and/or windlocks. The protruding portion of the endlock and/or windlock may press against an adjacent slat rolled below and create a bending moment in the end of the adjacent slat. Over time, the ends of the slats may crack or tear. Eventually, the endlocks and/or windlocks may be ripped off and the roll-up door may not function properly.

The endlock windlock and windlock of the present disclosure may be designed to work on both ends of the slats. In addition, the endlock windlock and windlock may have smaller dimensions than previously designed endlock windlocks and/or windlocks. Thus, less material and costs may be associated with fabricating the endlock windlock and/or windlocks of the present disclosure. In one embodiment, a gusset may be added to the design of the endlock windlock and/or windlocks to provide additional strength and integrity to the structure of the windlock.

As a result, when the roll-up door is coiled around the shaft when opened, the windlocks of the present disclosure may not create a bending moment on adjacent slats rolled below the windlock. Thus, cracking caused by known windlocks may be eliminated and the slats may have a longer life span. Moreover, the windlocks of the present disclosure may provide sufficient support against wind loads while using less materials and smaller dimensions to save on manufacturing costs of the windlocks.

Figure 1:
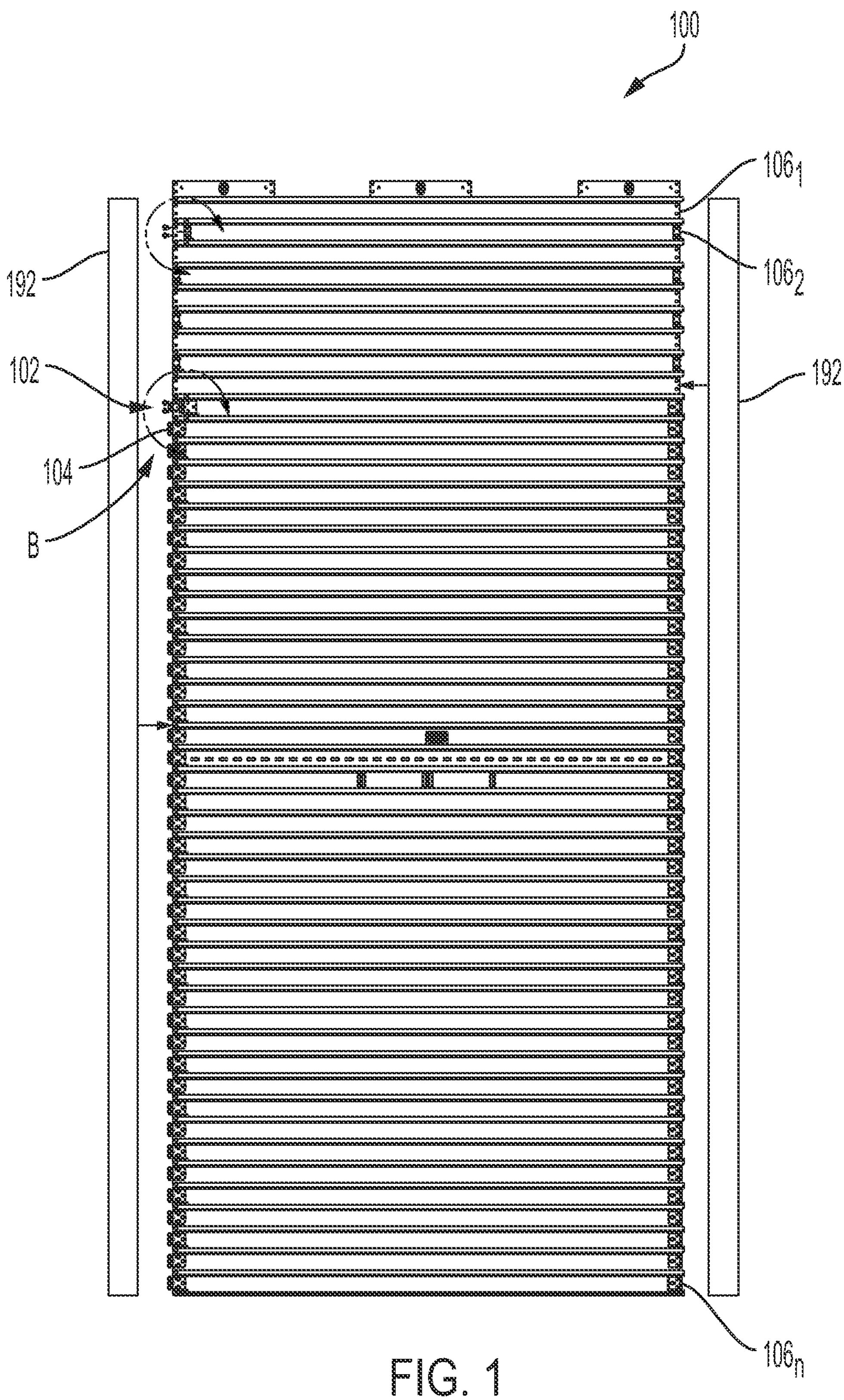
FIG. 1 illustrates an example roll-up door having endlock windlocks and windlocks of the present disclosure.

FIG. 1 illustrates an example roll-up door 100 having endlock windlocks 102 and windlocks 104 of the present disclosure. The roll-up door 100 may be located over an opening of a building or factory. It should be noted that FIG. 1 has been simplified for ease of explanation. For example, the roll-up door 100 may include additional components that are not shown. For example, the roll-up door 100 may be coupled to a shaft that is coupled to a motor. The motor may rotate the shaft to coil and/or uncoil the roll-up door 100 around the shaft. Other components may include a hood to cover the motor, a bottom bar to provide a weather-seal or locking mechanism, a counter-balance shaft, an adjustor bracket, and the like.

In one embodiment, the roll-up door 100 may be comprised of a plurality of slats $\mathbf{106}_1$ to $\mathbf{106}_n$ (hereinafter also referred to individually as a slat 106 or collectively as slats 106). The slats 106 may be fabricated from metal (e.g., aluminum, steel, alloys, and the like). Each slat has is an elongated structure with a width and a profile with a first rounded end as the top of the slat, a second rounded end as the bottom of the slat, a left end of the slat and a right end of the slat. The first rounded end and the second rounded end are oriented parallel to each other, and the left end and the right end are oriented parallel to each other and perpendicular to the first rounded end and the second rounded end. The profile of the slat is such that there is a front face of the slat and a back face of the slat. The profile further includes the first rounded end in a hook shape or "c" shape and the second rounded end in a hook shape or "c" shape that is able to slidably engage to the first rounded end.

It is intended that known profile designs and engagement designs for a single wall slat or a double walled slat (for insulated slats) are contemplated to be used with the endlocks and described herein.

In one embodiment, the slats 106 may be coupled together via a mechanical coupling and held in place by the endlock windlocks 102 and/or the windlocks 104. The endlock windlocks 102 may be coupled on each end of alternating slats 106. Said another way, the endlock windlocks 102 may be coupled on each end of every other slat 106.

In some embodiments, the windlocks 104 may be coupled to every other slat 106 where the endlock windlocks 102 are not used. For example, in some embodiments, every other slat 106 may have an endlock windlock 102 and every other slat 106 may have a windlock 104. To illustrate, slat $\mathbf{106}_1$ may be coupled to a windlock 104, the slat $\mathbf{106}_2$ may be coupled to an endlock windlock 102, the slat $\mathbf{106}_3$ may be coupled to a windlock 104, the slat $\mathbf{106}_4$ may be coupled to an endlock windlock 102, and so forth. The windlocks 104 may provide additional support and mechanical support against wind loads for the roll-up door 100.

In one embodiment, the roll-up door 100 may include guides 192. A guide 192 may be located along each side (e.g., the left side and the right side) of the roll-up door 100. A portion of the endlock windlocks 102 and/or the windlocks 104 may be secured inside of the guide 192, as discussed in further details below. As a result, the slats 106 may move up and down the guides 192 and be secured against wind loads.

Figure 2:
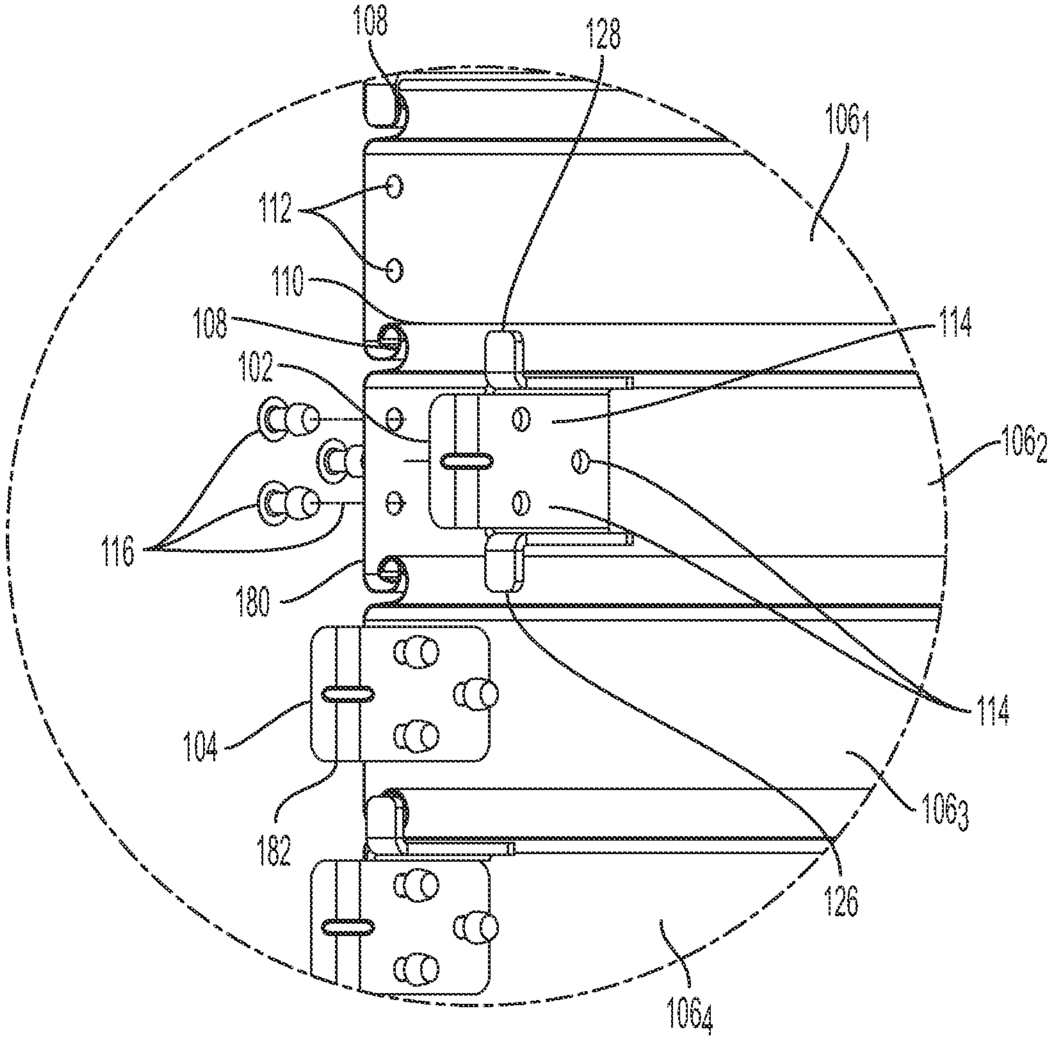
FIG. 2 is a block diagram of a more detailed exploded view of the example universal endlock coupled to slats of the roll-up door of the present disclosure.

FIG. 2 illustrates a more detailed exploded view of Detail B highlighted in FIG. 1 of how the endlock windlocks 102 and/or the windlocks 104 are coupled to the slats 106. For example, each slat 106 may include a first rounded end 108 and a second rounded end 110. The second rounded end 110 may have a diameter that is smaller than the first rounded end 108. However, it should be noted that the second rounded end 110 may be designed to have a diameter that is larger than the first rounded end 108.

In one embodiment, the first rounded end 108 and the second rounded end 110 may have a spiral form. As a result, the second rounded end 110 of a first slat $\mathbf{106}_1$ may be slid into the first rounded end 108 of an adjacent slat $\mathbf{106}_2$. Similarly, the second rounded end 110 of the slat $\mathbf{106}_2$ may be slid into the first rounded end 108 of an adjacent slat $\mathbf{106}_3$, and so forth. The spiral form and concentric fit of the first rounded end 108 of a first slat $\mathbf{106}_1$ and second rounded end 110 of an adjacent slat $\mathbf{106}_2$ may help keep the slats 106 interlocked.

In one embodiment, the endlock windlocks 102 and/or the windlocks 104 may be coupled to the ends of a slat 106 via a fastener 116. The fastener 116 may be any type of mechanical fastener. For example, the fastener 116 may be a screw, a bolt, a nut and bolt combination, a rivet, and the like.

In one embodiment, the endlock windlocks 102 and/or the windlocks 104 may include holes 114. The holes 114 of the endlock windlocks 102 and/or the windlocks 104 may be aligned with openings 112 of the slat 106. The fastener 116 may be fed through the openings 112 and the holes 114 that are aligned to couple the endlock windlocks 102 and/or the windlocks 104 to the end of a slat 106. A double walled slat with a front wall and a back wall may have holes in each wall or in a single wall of the slat for the attachment of the endlock windlocks 102 and/or windlocks 104.

In one embodiment, the endlock windlock 102 may include a first lip 126 and a second lip 128. The first lip 126 may secure the interlocking of the second rounded end 110 of a first slat $\mathbf{106}_1$ to the first rounded end 108 of the slat $\mathbf{106}_2$. The second lip 128 may secure the second rounded end 110 of the slat $\mathbf{106}_2$ to the first rounded end 108 of the slat $\mathbf{106}_3$. Thus, the first lip 126 and the second lip 128 may be coupled to each end of the slat $\mathbf{106}_2$ to prevent the slat $\mathbf{106}_2$ from moving laterally (e.g., side-to-side or left and right along the page) to become disconnected from the adjacent slats $\mathbf{106}_1$ and $\mathbf{106}_3$.

In one embodiment, the endlock windlock 102 may be coupled to each end of every other slat 106 as noted above. For example, if a first endlock windlock 102 is coupled to the slat $\mathbf{106}_2$, then a second endlock windlock 102 may be coupled to each end of the slat $\mathbf{106}_4$ (not labeled), a third endlock windlock 102 may be coupled to each end of the slat $\mathbf{106}_6$ (not labeled), and so forth.

In one embodiment, the design of the endlock windlock 102 may allow the same endlock windlock 102 to be coupled to either end (e.g., left end or right end) of the slat 106. In other words, two different endlock windlocks are not needed to secure the lefts side of the slat 106 and the right side of the slat 106.

In one embodiment, to provide additional mechanical support against wind loads, a windlock 104 may be coupled to every other slat 106 that is not coupled to an endlock windlock 102. The windlock 104 may not have the lips to secure the interlocking rounded ends 108 and 110 of adjacent slats 106.

In one embodiment, the endlock windlocks 102 and the windlocks 104 may each include a windlock lip 182. The windlock lip 182 may hang over an outer edge 180 of the slats 106. The windlock lip 182 of the endlock windlocks 102 and/or the windlocks 104 may be inserted into the guides 192. The windlock lip 182 may fit inside of the guides 192 to secure the outer ends 180 of the slats 106 inside of the guides 192. For example, the guides 192 may have a width that is approximately equal to a width of the windlock lip 182. The guides 192 may include a lip that interlocks with the windlock lip 182 to secure the endlock windlock 102 and/or the windlock 104 inside of the guides 192. As a result, the slats 106 may move up and down the guides 192. In addition, the windlock lip 182 may secure the slats 106 inside of the guides 192 to prevent the slats 106 from damage or misalignment under wind loads.

In one embodiment, the endlock windlock 102 and the windlock 104 may be fabricated from stamped steel or metal. In other words, a single sheet or piece of steel or metal may be stamped and/or manipulated to form all of the features of the endlock windlock 102 and/or the windlock 104, as described herein.

FIGS. 3-7 illustrate various views and dimensions for the endlock windlock 102. FIGS. 8-12 illustrate various views and dimensions for the windlock 104. Where certain features are shared in both items the same reference numerals are used. However, certain features may differ between the endlock windlock 102 and the windlock 104. In such cases, different reference numerals may be used.

Figure 3:
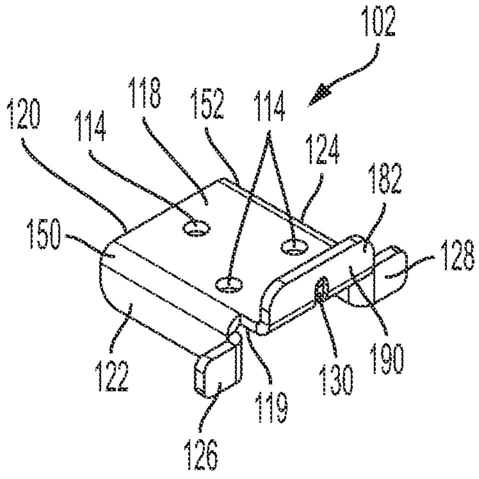
FIG. 3 is a block diagram of an isometric view of the example endlock windlock of the present disclosure.

FIG. 3 illustrates an isometric view of an example of the endlock windlock 102. In one embodiment, the endlock windlock 102 may be fabricated from 10 gauge ASTM A36 steel or equivalent. In one embodiment, the endlock windlock 102 may include a body 120. The body 120 may have a top or front side 118 and a bottom or back side 119. The body 120 may also have a first edge 150 and a second edge 152.

In one embodiment, a first side 122 may be formed along the first edge 150 and a second side 124 may be formed along the second edge 152. The first edge 150 and the second edge 152 may be angled or curved. The first side 122 and the second side 124 may be bent towards the back side 119. The first side 122 and the second side 124 may be bent to approximately 90 degrees relative to the body 120. In other words, a plane of the front side 120 may be positioned approximately at 90 degrees or perpendicular relative to a plane on the first side 122 and the second side 124. It should be noted that the term "plane" may refer to an infinite two dimensional imaginary surface that would lie parallel to a particular surface.

In one embodiment, a first lip 126 may be formed along an end closest to a windlock lip 182 of the first side 122. A second lip 128 may be formed along an end closest to the windlock lip 182 of the second side 124. In one embodiment, the first lip 126 may be bent away from the first edge 150 and the second lip 128 may bent away from the second edge 152. The first lip 126 may be bent such that a plane of the first lip 126 is approximately 90 degrees or perpendicular to a plane of the first side 122. The second lip 128 may be bent such that a plane of the second lip 128 is approximately 90 degrees or perpendicular to a plane of the second side 124.

In one embodiment, a surface of the first lip 126 and a surface of the second lip 128 may lie on a common plane. The common plane of the first lip 126 and the second lip 128 may be approximately 90 degrees or perpendicular to a plane of the front side 118 of the body 120. In one embodiment, the common plane of the first lip 126 and the second lip 128 may be parallel to a front surface 190 of the windlock lip 182.

In one embodiment, the windlock endlock 102 may include the windlock lip 182. The windlock lip 182 may be bent away from the back side 119 or towards the front side 118. In one embodiment, the windlock lip 182 may be bent in a direction that is opposite the direction the first side 122 and the second side 124 are bent. In one embodiment, the windlock lip 182 may be bent to be approximately 90 degrees or perpendicular to the body 120.

In one embodiment, a gusset 130 may be formed from part of the body 120 and the windlock lip 182. The gusset 130 may provide mechanical strength and stability to the windlock lip 182. In other words, the gusset 130 may allow the windlock lip 182 to be fabricated from a relatively thin piece of metal while providing a sufficient amount of strength to prevent the windlock lip 182 from bending away from the body 120 (e.g., flattening out to become parallel with the body 120 rather than being bent at an angle of approximately 90 degrees).

In one embodiment, the body 120, the first side 122, the second side 124, the first lip 126, the second lip 128, the gusset 130, and the windlock lip 182 may be formed from a single continuous piece of metal or steel. The metal or steel may be stamped to form the features and shapes in the relative orientation as described above. In another embodiment, the body 120, the first side 122, the second side 124, the first lip 126, the second lip 128, the gusset 130, and the windlock lip 182 may be coupled together as separate pieces via welding, glue, or any other coupling mechanism.

In one embodiment, the endlock windlock 102 may include holes 114. The one or more holes 114 may align with openings 112 of the slats 106. The holes 114 may be sized to allow a portion of the fasteners 116 to pass through the holes and the openings 112 when aligned to couple the endlock windlock 102 to the slats 106, but not allow a portion of the fasteners 116 to pass through the holes 114 and the openings 112, as shown in FIG. 2.

Figure 4:
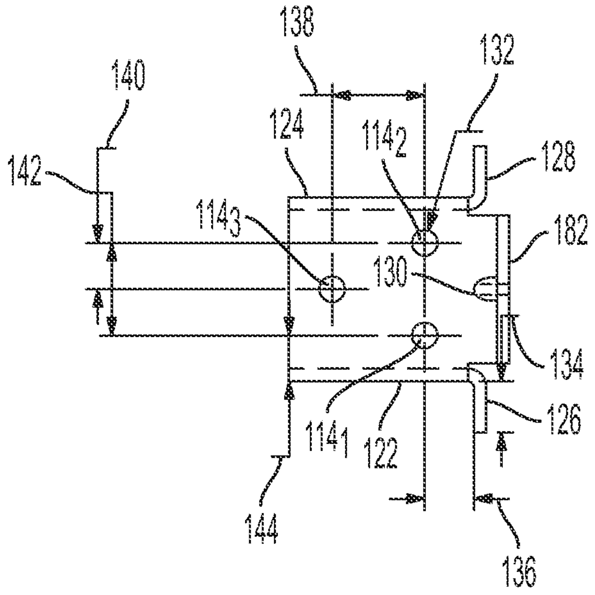
FIG. 4 is a block diagram of a top view of the example endlock windlock of the present disclosure.

FIG. 4 illustrates a top view of the endlock windlock 102. In one embodiment, the holes $\mathbf{114_1}$-$\mathbf{114_3}$ (hereinafter collectively referred to as holes 114) may have a diameter 132 of approximately 0.200 to 0.300 inches. In one embodiment, the holes 114 may have a diameter 132 of approximately 0.277 inches+/−0.01 inches.

In one embodiment, the holes $\mathbf{114_1}$-$\mathbf{114_3}$ may be spaced or arranged in a particular manner. For example, the centers of holes $\mathbf{114_1}$ and $\mathbf{114_2}$ may be spaced apart by a distance 142. A center of the hole $\mathbf{114_3}$ may be spaced apart from centers of the hole $\mathbf{114_1}$ and $\mathbf{114_2}$ by a distance 140. The centers of the holes $\mathbf{114_1}$ and $\mathbf{114_2}$ may be arranged on a common line and be spaced apart from the center of the hole $\mathbf{114_3}$ by a distance 138. The centers of the holes $\mathbf{114_1}$ and $\mathbf{114_2}$ may be spaced apart from bottom edges of the first lip 126 and the second lip 128, respectively, by a distance 136. The center of the hole $\mathbf{114_1}$ may be spaced apart from the first side 122 by a distance 144. The center of the hole $\mathbf{114_2}$ may be spaced apart from the second side 124 by the same distance 144.

In one embodiment, the distance 142 may be 1.000 inches+/−0.005 inches. In one embodiment, the distance 140 may be approximately 0.500 inches+/−0.005 inches. In one embodiment, the distance 138 may be approximately 1.000 inches+/−0.005 inches. In one embodiment, the distance 136 may be approximately 0.531 inches+/−0.015 inches. In one embodiment, the distance 144 may be approximately 0.495 inches+/−0.005 inches.

As can be seen in FIG. 4, the first lip 126 and first edge 150 and the second lip 128 and the second edge 152 may each form an "L" shape. In one embodiment, the first lip 126 and the second lip 128 may be formed a distance 136 relative to the centers of the holes $\mathbf{114_1}$ and $\mathbf{114_2}$. The distance 136 may allow a sufficient amount of the body 120 to be inserted into the slat 106 to provide leverage for the first lip 126 and the second lip 128 to secure adjacent slats 106, as described above and illustrated in FIG. 2. In one embodiment, the distance 136 may be approximately 0.531 inches+/−0.015 inches.

In one embodiment, the first lip 126 and the second lip 128 may extend away from the first edge 150 and the second edge 152, respectively, with a length 134 that is sufficient to cover the circumference of the first rounded end 108 of a slat 106. Thus, when the first rounded end 108 and the second rounded end 110 of adjacent slats are interlocked, the first lip 126 and the second lip 128 may prevent the second rounded end 110 from sliding out of the first rounded end 108, as described above. In one embodiment, the length 134 may be approximately 0.553 inches+/−0.05 inches.

Figure 5:
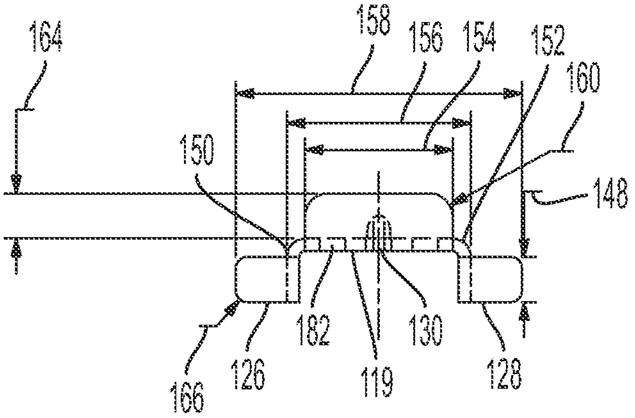
FIG. 5 is a block diagram of a front view of the example endlock windlock of the present disclosure.

FIG. 5 illustrates a front view of the endlock windlock 102. In one embodiment, the first side 122, the body 120, and the second side 124 may form a sideways "C" shape. As can be seen in FIG. 5, the first side 122 and the second side 124 may be bent towards the backside 119 of the body 120 or away from the front side 118 of the body 120. The first side 122 and the second side 124 may be bent at approximately 90 degrees or perpendicular to the body 120.

In one embodiment, the first side 122 and the second side 124 may be bent from the body 120 with a curve. In other words, the edges 150 and 152 may be curved rather than right angles. In one embodiment, the curve of the edges 150 and 152 may have a radius of curvature of approximately 0.060 inches+/−0.005 inches. In another embodiment, the first edge 150 and the second edge 152 may be bent at an approximately 90 degree angle.

In one embodiment, the windlock lip 182 may have a width 156. In one embodiment, the width 156 may be approximately 1.595 inches+/−0.005 inches. In one embodiment, the corners of the windlock lip 182 may have a curve 160. The radius of the curve 160 may be approximately 0.250 inches+/−0.005 inches.

In one embodiment, the windlock lip may have a height 164. The height 164 may be sufficient to hold against a lip of the guides 192. In one embodiment, the height 164 may be approximately 0.491 inches+/−0.005 inches.

In one embodiment, the body 120 may have a width 156. The width 156 may be approximately 1.989 inches+/−0.005 inches. In one embodiment, the endlock windlock 102 may have an overall width 158. The overall width 158 may be approximately 3.095 inches+/−0.005 inches.

In one embodiment, a height 148 or profile 148 of the first lip 126 and the second lip 128 may be less than a diameter or profile of the first rounded end 108 of the slats 106. As a result, when the endlock windlock 102 is coupled to the slat 106, the first lip 126 and the second lip 128 may not protrude beyond the outer edges of the first rounded end 108. Thus, when the roll-up door 100 is coiled to open, the first lip 126 and/or the second lip 128 may not apply a bending force to a slat surface (front face or back face) located below that is coiled underneath.

In one embodiment, the height 148 of the first lip 126 and the second lip 128 may be the same and may be a function of the diameter of the first rounded end 108. In one embodiment, the height 148 may be approximately 0.450 inches to 0.550 inches. In one embodiment, the height 148 may be approximately 0.491 inches+/−0.005 inches.

In one embodiment, the corners 166 of the first lip 126 and the second lip 128 may be rounded. In one embodiment, the corners 166 may be rounded to have a radius of curvature of approximately 0.125 inches+/−0.005 inches.

Figure 6:
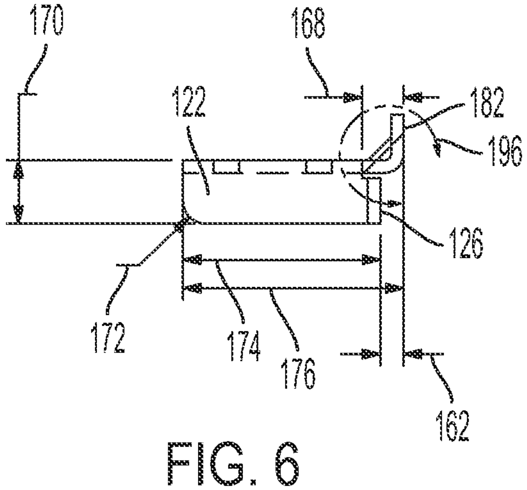
FIG. 6 is a block diagram of a side view of the example endlock windlock of the present disclosure.

FIG. 6 illustrates a side view of the endlock windlock 102. In one embodiment, the first lip 126 and the second lip 128 may have a thickness 162 that is sufficient to resist bending under the lateral force of the slats 106. In one embodiment, the thickness 162 may be approximately 0.060 inches+/−0.005 inches.

In one embodiment, the body 120 and the first lip 126 and/or the second lip 128 may have a length 174. The length 174 may be approximately 2.135 inches+/−0.005 inches. In one embodiment, the corners of first lip 126 and the second lip 128 may have a curve 172. In one embodiment, the radius of the curve 172 may be approximately 0.250 inches+/−0.005 inches. In one embodiment, the endlock windlock 102 may have an overall length 176. The overall length 176 may be approximately 2.385 inches+/−0.005 inches.

In one embodiment, the endlock windlock 102 and first side 122 and/or the second side 124 may have a height 170. In one embodiment, the height 170 may be approximately 0.688 inches+/−0.005 inches.

In one embodiment, windlock lip 182 may extend beyond the body 120 by a distance 168. In one embodiment, the distance 168 may be a function of a distance past an end 180 of the slat 106 and into the guide 192. In one embodiment, the distance 168 may be approximately 0.447 inches+/−0.005 inches.

Figure 7:
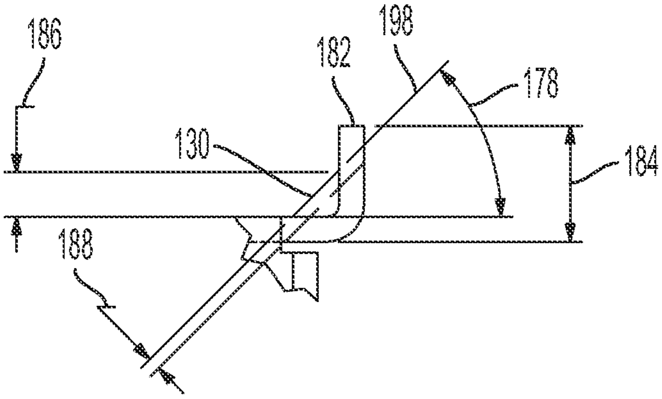
FIG. 7 is a block diagram of a more detailed view of the windlock lip of the endlock windlock of the present disclosure.

FIG. 7 illustrates a view of area 196 circled in FIG. 6. FIG. 7 illustrates further details of the gusset 130. In one embodiment, a plane 198 of the gusset 130 may form an angle 178 relative to the top surface 118 of the body 120. In one embodiment, the angle 178 may be approximately 45 degrees+/−5 degrees.

In one embodiment, the gusset 130 may be formed with a height 186. In other words, a top edge of the gusset 130 may reach the height 186 along the windlock lip 182. In one embodiment, the height 186 may be approximately 0.241 inches+/−0.005 inches.

In one embodiment, the windlock lip 182 may have a height 184 from a bottom of the windlock lip 182 to a top edge of the windlock lip 182. In one embodiment, the height 184 may be approximately 0.625 inches+/−0.005 inches.

As noted above, FIGS. 8-12 illustrate various views of an example windlock 104 of the present disclosure. The windlock 104 may be used in addition to the endlock windlock 102 to provide further reinforcement of the slats 106 within the guide 192 against wind load or other forces.

The windlock 104 may be similar in many respects to the endlock windlock 102. For example, the windlock 104 may be the same as the endlock windlock 102 except for the first lip 126 and the second lip 128. Thus, many of the same reference numerals are used for the windlock 104 illustrated in FIGS. 8-12 as used in the endlock windlock 102 illustrated in FIGS. 3-7. However, the windlock 104 may have some different features and different dimensions, which are described below and illustrated in FIGS. 8-12.

Figure 8:
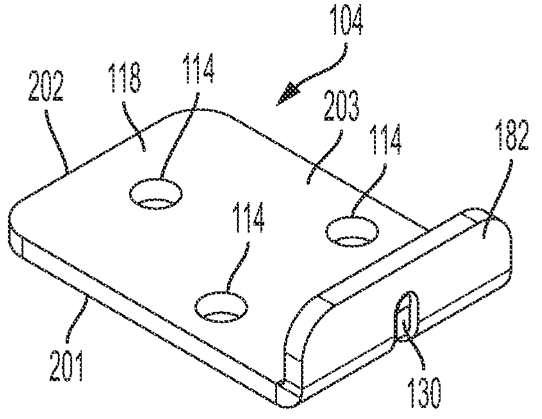
FIG. 8 is a block diagram of an isometric view of an example windlock of the present disclosure.

FIG. 8 illustrates a bottom isometric view of a windlock 104. In one embodiment, the windlock 104 may be fabricated from stamped metal or steel. In one embodiment, the windlock 104 may be fabricated from 10 gauge ASTM A36 steel or equivalent.

In one embodiment, the windlock 104 may include holes 114 formed in the body 120. The fasteners 116 may be fed through the holes 114 to secure the windlock 104 to the slats 106, as illustrated in FIG. 2 and described above. In one embodiment, the windlock 104 may also include a windlock lip 182 and a gusset 130.

However, the windlock 104 may not have the first side 122 and the second side 124 and the first lip 126 and the second lip 128 shown with the endlock windlock 102. Rather, the windlock 104 may have a continuous outer perimeter formed by edges 201, 202, and 203.

Figure 9:
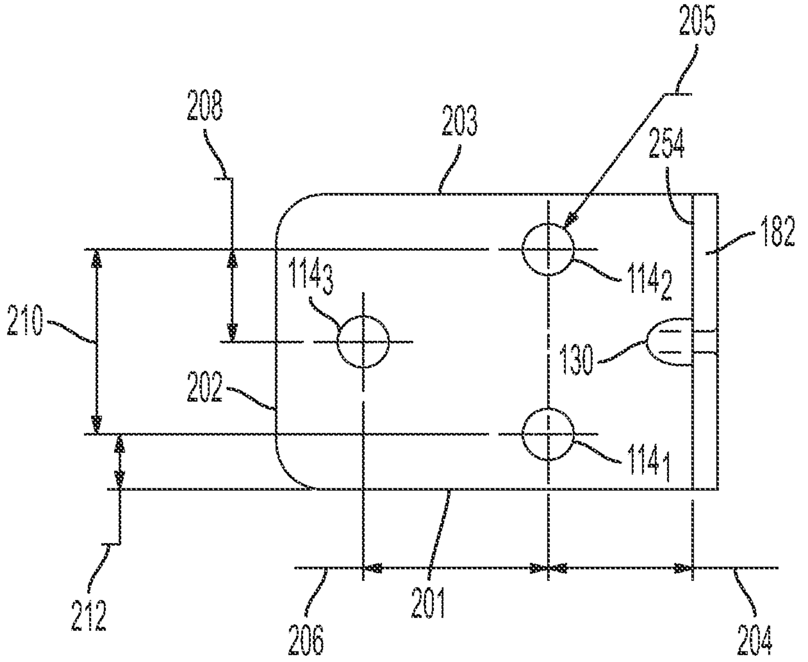
FIG. 9 is a block diagram of a bottom view of the example windlock of the present disclosure.

FIG. 9 illustrates a bottom view of the windlock 104. In one embodiment, the holes $\mathbf{114}_1$-$\mathbf{114}_3$ (hereinafter collectively referred to as holes 114) may have a diameter 205 of approximately 0.200 to 0.300 inches. In one embodiment, the holes 114 may have a diameter 205 of approximately 0.277 inches+/−0.01 inches.

In one embodiment, the holes $\mathbf{114}_1$-$\mathbf{114}_3$ may be spaced or arranged in a particular manner. For example, the centers of holes $\mathbf{114}_1$ and $\mathbf{114}_2$ may be spaced apart by a distance 210. A center of the hole $\mathbf{114}_3$ may be spaced apart from centers of the holes $\mathbf{114}_1$ and $\mathbf{114}_2$ by a distance 208. The centers of the holes $\mathbf{114}_1$ and $\mathbf{114}_2$ may be arranged on a common line and be spaced apart from the center of the hole $\mathbf{114}_3$ by a distance 206. The centers of the holes $\mathbf{114}_1$ and $\mathbf{114}_2$ may be spaced apart from the edges 201 and 203, respectively by a distance 212. The center of the hole $\mathbf{114}_1$ and/or the hole $\mathbf{114}_2$ may be spaced apart from an inner side 254 of the windlock lip 182 by a distance 204.

In one embodiment, the distance 210 may be 1.000 inches+/−0.005 inches. In one embodiment, the distance 208 may be approximately 0.500 inches+/−0.005 inches. In one embodiment, the distance 206 may be approximately 1.000 inches+/−0.005 inches. In one embodiment, the distance 212 may be approximately 0.298 inches+/−0.005 inches. In one embodiment, the distance 204 may be approximately 0.781 inches+/−0.005 inches.

Figure 10:
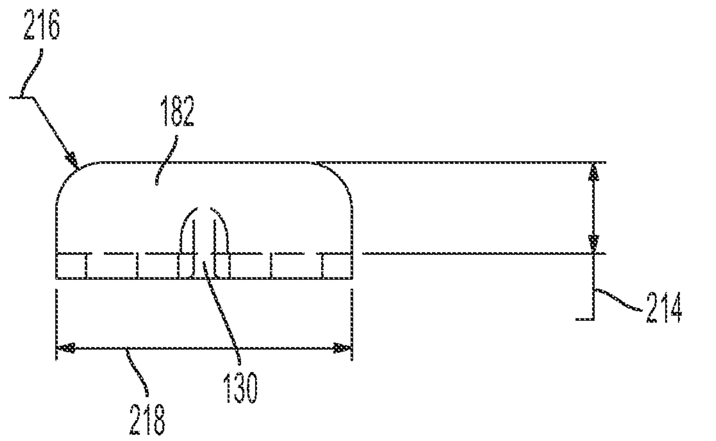
FIG. 10 is a block diagram of a front view of the example windlock of the present disclosure.

FIG. 10 illustrates a front view of the windlock 104. In one embodiment, the corners of the windlock lip 182 may have a curve 216. The curve 216 may have a radius of approximately 0.250 inches+/−0.005 inches. In one embodiment, the windlock lip 182 may have a width 218 and a height 214. The width 218 may be approximately 1.595 inches+/−0.005 inches. The height 214 may be approximately 0.491 inches+/−0.005 inches.

Figure 11:
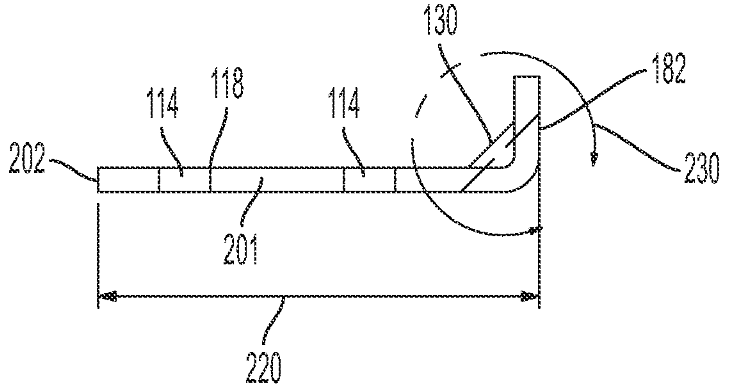
FIG. 11 is a block diagram of a side view of the example windlock of the present disclosure.

FIG. 11 illustrates a side view of the windlock 104. In one embodiment, the windlock 102 may have an overall length 220. In one embodiment, the overall length 220 may be measured from the edge 202 to the outer side of the endlock windlock 182. In one embodiment, the overall length 220 may be approximately 2.385 inches+/−0.005 inches.

Figure 12:
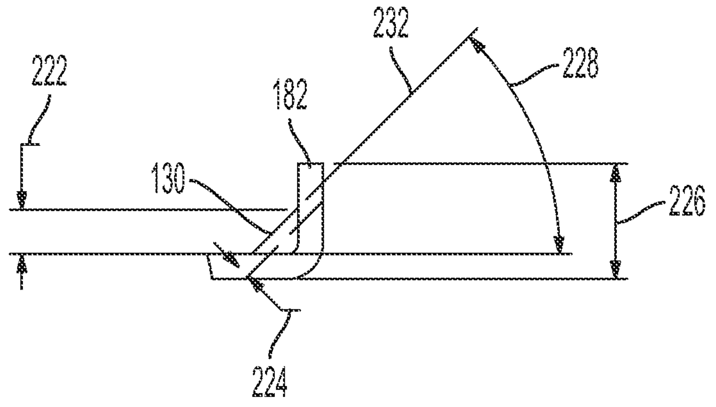
FIG. 12 is a block diagram of a more detailed view of the windlock lip of the windlock of the present disclosure.

FIG. 12 illustrates a more detailed view of an area 230 circled in FIG. 11. FIG. 12 illustrates further details of the gusset 130. In one embodiment, a plane 232 of the gusset 130 may form an angle 228 relative to the top surface 118 of the body 120. In one embodiment, the angle 228 may be approximately 45 degrees+/−5 degrees.

In one embodiment, the gusset 130 may be formed with a height 222. In other words, a top edge of the gusset 130 may reach the height 222 along the windlock lip 182. In one embodiment, the height 222 may be approximately 0.241 inches+/−0.005 inches.

In one embodiment, the windlock lip 182 may have a height 226 from a bottom of the windlock lip 182 to a top edge of the windlock lip 182. In one embodiment, the height 226 may be approximately 0.625 inches+/−0.005 inches.

The present disclosure provides various dimensions for the endlock windlock 102 and a windlock 104 fabricated from stamped steel/metal. It should be noted that the dimensions are provided as examples. However, as the size and dimensions of the slats 106 are changed, the dimensions of the endlock windlock 102 and/or the windlock 104 may also be changed. However, the proportions of the dimensions relative to the various components (e.g., the dimensions of the first lip 126 to the first side 122 and the body 120) may remain constant even when the size of each individual dimension is changed.

Thus, the present disclosure provides an endlock windlock 102 and windlock 104 that may prevent slats 106 from being damaged as the roll-up door is coiled up and down. In addition, the endlock windlock 102 and windlock 104 may be used on either side of the roll-up door 100 to secure adjacent slats 106.

As a result, a single type of endlock windlock 102 and windlock 104 may be manufactured and kept in inventory to reduce overall installation costs, manufacturing costs, and inventory costs. In addition, the life of the roll-up door 100 may be increased as the endlock windlock 102 and the windlock 104 of the present disclosure may prevent damage to the slats 106 unlike previous endlock designs.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A windlock, comprising:
a body, wherein the body includes holes to receive a fastener to be coupled to an end of a slat of a roll-up door;
a windlock lip formed from a portion of the body that is bent from the body, wherein the windlock lip is inserted into a guide of the roll-up door to move within the guide and to secure the slat within the guide; and
a gusset coupled to the body and the windlock lip to provide mechanical strength to the windlock lip, wherein the body, the windlock lip, and the gusset are formed from a single piece of 10 gauge steel.

2. The windlock of claim 1, wherein the windlock lip is bent at approximately 90 degrees relative to the body.

3. The windlock of claim 1, wherein a surface of the gusset is formed at approximately 45 degrees relative to the body and the windlock lip.

4. The windlock of claim 1, wherein the gusset is formed from a portion of the windlock lip and the body.

5. A windlock, comprising:
a body, wherein the body includes holes to receive a fastener to be coupled to an end of a slat of a roll-up door;
a windlock lip formed from a portion of the body that is bent from the body, wherein the windlock lip is inserted into a guide of the roll-up door to move within the guide and to secure the slat within the guide;
a gusset coupled to the body and the windlock lip to provide mechanical strength to the windlock lip;
a first lip formed along a first side of the body to secure a first connection between a first pair of adjacent slats of the roll-up door; and
a second lip formed along a second side of the body to secure a second connection between a second pair of adjacent slats of the roll-up door, wherein the body, the windlock lip, the gusset, the first lip, and the second lip are formed from a single piece of 10 gauge steel.

6. The windlock of claim 5, wherein the windlock lip is bent at approximately 90 degrees relative to the body.

7. The windlock of claim 5, wherein a surface of the gusset is formed at approximately 45 degrees relative to the body and the windlock lip.

8. The windlock of claim 5, wherein the gusset is formed from a portion of the windlock lip and the body.

9. The windlock of claim 5, wherein the first lip and the second lip lie on a common plane.

10. The windlock of claim 9, wherein the common plane of the first lip and the second lip is perpendicular to a surface of the body.

11. The windlock of claim 5, wherein the first side and the first lip form a first "L" shape and the second side and the second lip form a second "L" shape.

12. A roll-up door, comprising:
a first slat, comprising:
a first rounded end;
a second rounded end, wherein the second rounded end has a smaller circumference than the first rounded end; and
a pair of openings;
a second slat having a second rounded end inserted into the first rounded end of the first slat;
a third slat having a first rounded end, wherein the second rounded end of the first slat is inserted into the first rounded end of the third slat; and
a windlock endlock coupled to the first slat, wherein the windlock endlock comprises:
a body, wherein the body includes holes, wherein the windlock endlock is coupled to the first slat via fasteners fed through the holes and the pair of openings of the first slat;
a first windlock lip formed from a portion of the body that is bent from the body;
a first gusset coupled to the body and the first windlock lip to provide mechanical strength to the first windlock lip;
a first lip to secure the second rounded end of the second slat into the first rounded end of the first slat; and
a second lip to secure the second rounded end of the first slat into the first rounded end of the third slat, wherein the body, the first windlock lip, the first gusset, the first lip, and the second lip are formed from a single piece of 10 gauge steel; and a guide to support the first slat, the second slat, and the third slat, wherein the first windlock lip is inserted into the guide.

13. The roll-up door of claim 12, further comprising:

a windlock coupled to slats adjacent to slats coupled by the windlock endlock.

14. The roll-up door of claim 13, the windlock, comprising:

a body, wherein the body of the windlock includes holes;

a second windlock lip formed from a portion of the body of the windlock that is bent from the body of the windlock; and a gusset coupled to the body of the windlock and the second windlock lip to provide mechanical strength to the second windlock lip.

15. The roll-up door of claim 12, wherein the first windlock lip is bent at approximately 90 degrees relative to the body.

16. The roll-up door of claim 12, wherein a surface of the first gusset is formed at approximately 45 degrees relative to the body and the first windlock lip.

17. The roll-up door of claim 12, wherein the first gusset is formed from a portion of the first windlock lip and the body.

* * * * *